United States Patent [19]

Blum

[11] 3,978,274

[45] Aug. 31, 1976

[54] ADHESIVE TAPE HAVING PRINTABLE RELEASE COATING

[75] Inventor: Alfred Blum, Skokie, Ill.

[73] Assignee: Borden, Inc., Columbus, Ohio

[22] Filed: July 15, 1974

[21] Appl. No.: 488,322

[52] U.S. Cl. ................................. 428/476; 428/500
[51] Int. Cl.² ............................................. C09J 7/04
[58] Field of Search .... 117/122 P, 122 PA, 122 PF, 117/68.5, 76 A, 161 P, 161 UZ; 427/207, 208; 428/476, 500

[56] References Cited
UNITED STATES PATENTS

| | | | |
|---|---|---|---|
| 2,818,169 | 12/1957 | Bergstedt | 117/68.5 X |
| 3,051,588 | 8/1962 | Lavanchy | 117/68.5 |
| 3,066,043 | 11/1962 | Hechtman et al. | 117/68.5 |
| 3,543,920 | 12/1970 | Crocker et al. | 117/68.5 X |
| 3,590,017 | 6/1971 | Bartell et al. | 117/68.5 X |
| 3,690,924 | 9/1972 | Estes | 117/68.5 |
| 3,773,538 | 11/1973 | Milutin et al. | 117/68.5 X |
| 3,817,821 | 6/1974 | Gallini | 117/68.5 X |
| 3,851,761 | 12/1974 | Schwarcz | 117/68.5 X |
| 3,855,052 | 12/1974 | Mestetsky | 117/68.5 X |

*Primary Examiner*—Bernard D. Pianalto
*Attorney, Agent, or Firm*—George P. Maskas; George A. Kap; Daniel D. Mast

[57] ABSTRACT

A pressure-sensitive tape with a printable release coat on the side opposite to the adhesive face, the release coat including a vinyl film former, an acrylic resin and a polyamide plasticizing resin.

11 Claims, No Drawings

ADHESIVE TAPE HAVING PRINTABLE RELEASE COATING

This invention relates to pressure-sensitive tape which includes a substrate, a coat of normally tacky and pressure-sensitive adhesive on one side of the substrate and a printable coat of a release composition on the opposite side of the substrate. More specifically, this invention is directed to pressure-sensitive tape having printable solvent-based release coating composition which comprises a vinyl resin film former, an acrylic resin and a polyamide resin plasticizer.

Recent patents describe a variety of pressure-sensitive tapes comprising in essence a normally tacky and pressure-sensitive elastomeric adhesive, a flexible substrate and a release coat which facilitates the unwind of tapes made in roll form. For the most common pressure-sensitive tapes with various substrates, satisfactory unwind properties are achieved with a release coating generally comprising stearate metallic complex compounds or polymers with a carbon chain backbone having attached thereto an adequate number of fatty acid radicals. Although very efficient at relative low coating weights, these release agents, such as for example "Quilon" supplied by du Pont or the release polymer described in U.S. Pat. No. 3,475,196, exhibit very poor ink receptivity thus precluding any attempts to print the coated substrates which is essential for certain applications and advertisement purposes.

Numerous attempts have been made to overcome this limitation of prior art release compositions. Thus, some of the release compositions supplied in emulsion or dispersion form were found to show good printability and release properties when applied on paper substrates. However, due to their high moisture sensitivity, poor electrical properties and poor anchorage to plastic films, the use of these latex release coats was rather limited.

A major difficulty experienced in printing of polymeric films has been that of ink adhesion. A prior art approach to solve this problem by surface roughening and subsequent application of one of several pigmented backsize coatings did not gain wide acceptance since it proved to be too cumbersome and produced an objectionable haziness, thus precluding the production of transparent printable tapes. In the case of pressure-sensitive cellophane tapes, the problem was partially solved by a different approach; namely, printing of the cellophane film prior to the tape manufacturing process. According to another method, the printed substrate is overcoated before rewinding with an appropriate release coat whose function is to seal-off the printed message from any contact with the pressure-sensitive adhesive and insure at the same time proper roll unwind properties. This approach, however, involves cumbersome modifications in the standard printing equipment, increased manufacturing costs and also precludes the use of more modern and versatile printing techniques such as those utilized for multicolor label stock decorative ribbons, etc.

The present invention offers for the first time a comprehensive solution to the printing of pressure-sensitive tapes by providing a release coat/ink system which has the ability to develop those crucial interfacial adhesion forces required to withstand successfully the stress placed on the backing by aggressive pressure-sensitive adhesives upon roll unwinding. The novel class of solvent release coats was found to exhibit many desirable properties including: excellent ink receptivity and sharp printability with a commercially available flexographic ink; perfect clarity of dried coatings which does not interfere with substrate transparency since there is no need for pigmentation to achieve good ink receptivity; no ink transfer or adhesive pick-off when shelf or oven (120°F) aged rolls or pressure-sensitive tapes having an aggressive pressure-sensitive adhesive are unrolled at various speeds; and good anchorage to a variety of substrates. Additional advantages include ease of preparation utilizing low cost commercially available resins which can be dissolved at room temperature in common solvent blends and applied by any conventional coating method; improved anti-static properties; comparable release performance to prior art backsize with respect to retention of tack and adhesion values under shelf and oven aging conditions in absence of fatty acid radicals or release additives; and in contrast to certain standard release agents, such as Quilon sold by du Pont and that of Mystik Tape's release agent described and claimed in U.S. Pat. No. 3,475,196, which are known to exhibit unwind zippiness in unwind force for a certain pressure-sensitve adhesive, the new release coats appear to possess a smoother unwind which can be adjusted, if necessary, by simple reformulation.

The above properties were attained by selecting a ternary resin system which, upon solvent evaporation and oven drying, develops a continuous hard antiblocking surface in absence of any crosslinking agents. It is believed that this results from a chain-stiffening effect achieved through molecular entanglements, interpenetrating polymeric networks and secondary bonding forces. In essence, the ternary system comprises a vinyl film former; a hard thermoplastic acrylic resin to impart a high melting point, toughness and clarity to the release coat; and a polyamide plasticizing resin which acts as an adhesion promoter toward plastic film substrates as well as toward flexographic inks.

The vinyl film former is an intermediate to high molecular weight vinyl chloride homopolymer or copolymer solution resin, and especially such resins containing reactive carboxy or hydroxy groups. Examples of such resins are polyvinyl chloride; polyvinyl acetate; vinyl butyral resins; copolymers of vinyl chloride and vinyl acetate; vinyl alcohol-acetate resins; copolymers of vinyl chloride and vinylidene chloride; and copolymers of vinyl chloride and acrylonitrile which come in solution form dissolved in toluene, methyl acetate or butyl acetate. Vinyl butyral resins are partial butyrals of polyvinyl alcohol which retain some of the alcohol groups. Vinyl butyral resins come in dry and solution form and have wide range of molecular weights.

The vinyl film formers must be solution resins, which means that the resins must be soluble at room temperature in conventional straight chain or cyclic solvents such as acetone, methyl ethyl ketone, cyclohexanone, etc., or blends thereof with hydrocarbon diluents such as toluene, xylene, etc. Generally speaking, the vinyl resins are grouped into a low molecular weight class of less than 10,000, an intermediate group where the average molecular weight is from 20,000 to 40,000 and the high molecular weight group where the values exceed 40,000. Resins suitable for my purpose are those which fall into the molecular weight range of between 10,000 to 100,000, and preferably between 20,000 and 60,000. The low molecular weight group of resins can also be used but these resins should be mixed with higher molecular weight vinyl film formers in order to raise the average molecular weight of the mixture to a range between 10,000 and 100,000. Bakelite VMCH, VAGH and VMCC are examples of suitable vinyl chloride/vinyl acetate film formers which are sold by Union Carbide. VMCH is a copolymer of 86% vinyl chloride, 13% vinyl acetate and 1% of maleic anhydride. VAGH is a copolymer 91% vinyl chloride, 3% vinyl acetate and 6% vinyl alcohol. VMCC is a copolymer of 83% vinyl chloride, 16% vinyl acetate and 1% maleic anhydride. Other suitable resins are Geon 440×24 and Geon 443 from B. F. Goodrich, Vc series from Borden and Exon series from Firestone.

The vinyl film formers are preferably used in powder form although solution form thereof is acceptable. Vinyl film formers can be modified with butadiene elastomers to impart greater flexibility to the release coating.

To determine whether a vinyl resin can serve as a suitable film former, a solution of the resin is made in an organic solvent 5% minimum solids. Ten grams of this solution is added to an aluminum dish 2 inches in diameter and evaporated at room temperature over a period of time of at least 24 hours and a maximum of 7 days to form a film on the bottom of the dish. If this film can be stripped without tearing or breaking up, the resin is a film former.

Upon air drying at relatively low temperatures of about 68° to 220°F, the dissolved film forming resin must form via solvent evaporation a coherent homogeneous film which is tough yet flexible enough to act as a sealer. This property of the vinyl film former allows it to seal-off the pressure-sensitive adhesive from the tape backing when the tape is wound into a roll.

There are additional requisites of the vinyl film formers. These resins should be highly compatible with other synthetic polymers and should exhibit good ink receptivity as well as acceptable adhesion to the substrate.

The acrylic resins impart to the coating composition a higher melting point, toughness, clarity, protective and decorative durability, i.e., resistance to abrasion, weathering and discoloration. These thermoplastic acrylic resins are solution polymers of $C_1$ to $C_6$ lower alkyl esters of methacrylic acid and copolymers of lower alkyl methacrylates with $C_1$ to $C_8$ lower alkyl acrylates wherein the lower alkyl methacrylates are preferably present in excess of 50% by weight. Other methacrylate and acrylate ester solution copolymers containing a small amount of methacrylic or acrylic acid are suitable provided their viscosity average molecular weight is about 90,000 which offers an optimum compromise between mechanical properties and solution viscosity. Also included are copolymers $C_1$ to $C_6$ of lower alkyl, especially ethyl, acrylates with styrene prepared by emulsion polymerization of the monomers in aqueous medium containing a redox catalyst and an anionic emulsifying agent. The methacrylic resins are preferably in powder form. Examples of some of the commercial resins includes Acryloid A-11 sold by Rohm and Haas. This is a copolymer of methyl methacrylate and ethyl acrylate where ethyl acrylate is in the minor proportion. Another one is Acryloid B-99 which is a 60/40 copolymer of methyl methacrylate and butyl methacrylate. Other suitable resins include Acryloid B-44 which is a copolymer of methyl methacrylate and ethyl acrylate having a Tukon hardness of 16; Acryloid B-66, a 70/30 copolymer of butyl methacrylate and methyl methacrylate; Acryloid B-82, a copolymer of methyl methacrylate and ethyl acrylate having Tukon hardness of 10 to 11; and Rohm & Haas' resin ZR-128, a copolymer of ethyl acrylate and styrene with a Tukon hardness of 14. Du Pont's Elvacite, which is also suitable for my purposes, is similar to Acryloid A-11. Another grade is EP 2021, which is higher in molecular weight and chemically a polymethyl methacrylate containing a small amount of methacrylic acid. Elvacite 2042 is a homopolymer of ethylmethacrylate of 300,000 molecular weight and Tukon hardness of 11. Elvacite 2043 is a copolymer of ethylmethacrylate and a small amount of methacrylic acid. Although its molecular weight is about 30,000 its Tukon hardness is 11.

The substitution of a methyl group for a hydrogen atom producing the methylacrylate polymer restricts the freedom of rotation of the polymer backbone by steric hindrance and thus produces harder, higher tensile strength and lower elongation polymers than the acrylate counterpart. For similar reasons, the methyl group in the methacrylate component is preferable to any other alkyl substituent.

Preferred acrylic resins for the printable release coat described herein have medium to high molecular weights which is inclusive of average molecular weights in the approximate range of 50,000 to 150,000. Medium molecular weight is between about 50,000 to 80,000 whereas high molecular weight is in excess of 100,000 up to about 300,000. The low molecular weight thermosetting acrylic resins, which have values between 20,000 and about 50,000, can also be used but they are of almost negligible practical value since they require curing temperatures which usually exceed thermostability of plastic film substrates. Similar modifying effects can also be achieved by utilizing small amounts of very high molecular weight thermoplastic solution acrylic resins of up to 300,000 or lower molecular weight thermosetting solution resins in conjunction with crosslinking agents. In addition to good solubility, wide compatibility, fast solvent release and maximum grease resistance, a desirable range of Tukon hardness is a Knoop number between 14 and 20. The Knoop numbers represent the ultimate hardness of solvent free resins. The measurements are carried out on 1/16 inch thick, compression molded films using a Tukon tester with 25 g load at 75°F, 50% R.H. These values are more related to the bulkiness of structural polymer unit than to its molecular weight. The higher the Knoop number the more suitable is the resin for the ternary printable release coat system. Since methyl methacrylate is a compact molecule, a polymethyl methacrylate homopolymer would be the ideal resin. However, because of certain shortcomings such as poor solubility, poor cold crack resistance, marginal adhesion to undercoats or various substrates as well as poor solvent release properties, these resins are of little practical value for the coating industry. So far, copolymerization with other acrylic momomers, which is in fact internal plasticization, is the most common and practical method to overcome the mentioned deficiencies of poly (methyl methacrylate). This explains the great variety of methyl methacrylate copolymers presently produced commercially and tailored to meet the requirements of numerous coating applications.

Another limiting factor on the acrylic resins is their solubility. Suitable acrylic resins must be soluble in organic, aliphatic and aromatic, solvents.

The third component of the ternary release coating composition is the modified and unmodified polyamide plasticizing resins. These resins, by virtue of their polarity, have the ability to act as adhesion promoters toward the substrate while also providing anchoring sites for the ink on the dry release coat surface as well as anti-blocking properties. In the ternary system described herein, these resins act as external, non-migrating plasticizers for the rather tough acrylic and vinyl resins to insure maximum flexibility for the release coating applied on a substrate. These are amorphous resins which are prepared by condensing polyfunctional amines with dimeric and trimeric fatty acids having an average molecular weight in the range of 3,000 to 30,000 which subsequently can be modified with waxes and plasticizers by coreacting these additives. The polyamide plasticizing resins are soluble at room temperature either in the common organic solvents or a blend thereof, such as a 9/1 blend of toluene and isopropanol. Their softening points are in the range of from 40° to 150°C, preferably from 50° to 130°C, and melting point range is from 60° to 200°C, preferably from 95° to 120°C. Suitable commercial polyamide resins include Versamid 950 (General Mills), Polymid 1211 (Lawter Chemicals), and Unirez 2950 (Union Camp), all of which are reported to be similar in composition and performance to Versamid 950.

Suitable Versamid polyamide resins have average molecular weights in the range of 6,000 to 9,000 and are long chain linear polymers ranging from hard, chemically inert resins through tacky, gum-like materials to reactive, pourable fluids. They are derived from the reaction of dimerized linoleic acid with di-or polyamines, as shown below:

nHOOC—R—COOH + nH$_2$NR'—NH$_2$ → HO (—OC—R—CONHR'—NH—)$_n$ H where R is a hydrocarbon group of an indeterminate configuration containing 34 carbon atoms. The polyamine used is generally ethylene diamine and R' is —CH$_2$CH$_2$—. This group of polyamide plasticizing resins and their preparation is described in U.S. Pat. Nos. 2,379,413 and 2,450,940 which are hereby incorporated by reference to complete definition and function thereof with respect to chemical composition as to number of carbons per molecule and chemical structure thereof, and also their chemical and physical properties. The U.S. Pat. No. 2,379,413 describes preparation of polyamide resins by reacting at a high temperature ammonia, primary and secondary amines and alkylolamines with acids or esters which are obtained by polymerizing at elevated temperature polyene fatty acids or their respective esters.

Versamid polyamide resins 930, 940 and 950 are generally soluble in alcohols such as n-propanol, isopropanol, butanol and cellosolve. They are more readily soluble in a blend of 1/1 alcohol and aliphatic or aromatic hydrocarbons. Versamid 900 has very limited solubility, however, up to 25% can be dissolved in a 1/1 mixture of n-butanol and phenol.

An example of a polyamide resin which is not suitable for purposes herein is Acrawax C, (m.p. 284°–290°F) produced by Glyco Company. This resin is insoluble virtually in all solvents at ambient temperature. Although it is soluble in hot aromatic and chlorinated organic solvents, it precipitates on cooling. Its molecular weight is reported as being 574 and it is crystalline, at least to a degree.

Suitable and preferred ranges in parts by weight per 100 parts of the release coat composition for essential release coat components are as follows:

|  | Suitable Range | Preferred Range |
|---|---|---|
| vinyl film former | 10–60 | 15–50 |
| acrylic resin | 10–60 | 15–50 |
| polyamide plasticizer resin | 20–80 | 50–50 |

The printable release coat which is applied to one side of the substrate is prepared by dissolving the components in an organic solvent or a blend of such solvents at about the 10% solids level, preferably at room temperature. Percent solids in such solution can vary from 2 to 15%. No particular sequence of addition is required. Suitable solvents include aromatic hydrocarbons, ketones, esters, chlorohydrocarbons, glycolethers, ethers, alcohols, and nitroparaffins. More specifically they include toluene, methyl ethyl ketone, ethylacetate, trichloroethylene, methyl cellosolve, tetrahydrofuran (THF), isopropanol, and nitroethane.

To design a suitable solvent system for the essential release coat components consisting of two distinct resin classes (1) vinyl, acrylic and (2) poly amides which are in essence incompatible upon blending of respective solutions, the solubility parameter concept developed by Hildebrand (THE SOLUBILITY OF NON ELECTROLITES, Rheinhold Publishing Co., New York -1949) and applied to polymer coatings by Burrell (Official Digest, Vol. 27, 1955) can be utilized.

The solubility parameter δ is a measure of the intermolecular energy of the molecules. For solvents, the solubility parameter is obtained from the relationship that is shown in the following equation:

$$\delta = \left(\frac{DE}{Vm}\right)^{1/2}$$

in which: δ = solubility parameter
DE = molar energy of vaporization of the solvent
Vm = molar volume = $\frac{M \cdot W}{d}$ For polymers, calculable values can be derived according to Small (J. Applied Chem. Vol 3, 1953) from the respective density and molar attraction constants of functional groups attached to polymer structural formula. Thus,

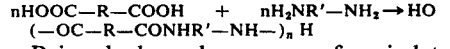

$$\delta = \frac{d \Sigma G}{M}$$

where:
d = polymer density
M = polymers repeating unit molecular weight
G = sum of molar attraction constants for each organic grouping in the polymer's repeating unit It was discovered that good resin compatibility combined with excellent film forming properties from clear solutions can be achieved provided the solvent blend in the release coat formulation is selected in proportions yielding δ values within the range of 8 to 12.

Modifiers can be used to make the desired changes in the release composition described herein. Examples of such modifiers include bisphenol A and epoxy, phenoxy or polyketone resins.

The release composition is applied to the substrate at a dry coating weight of about 0.02 to 0.2 ounces per square yard. The substrate or backing for the tape is a thin, flexible, material selected from paper, latex-impregnated paper, regenerated cellulose, cellulose acetate, polyethylene, polypropylene, cellophane, nitrocellulose, polyethylene terephthalate (Mylar), polyamide resins (nylons), thermostable polyamide resins (Nomex), polyamide resins (Kapton), vinyl polymers utilized for rigid or plasticized films, polytetra-fluoroethylene (Teflon), vinyl polymers, hydroxy ether of cellulose, hydroxyethyl cellulose, etc. Other suitable substrates include cotton, rayon, polyester cloth or blends thereof as well as non-woven textures. The preferred substrates are cellulose derivatives, especially cellulose acetate. Other plastic film substrates can be used although they may require mechanical treatment or suitable specialty primers.

The thickness of the substrate varies according to the application of the tape made therefrom. Normally, it varies from 1 to 5 mils for p.s. tape.

The adhesive which is applied to the substrate on the opposite side of the release coat is a conventional pressure sensitive adhesive. One class of such adhesives consists broadly of natural or synthetic rubbers such as smoked sheet, pale crepe, polyisoprene (Natsyn), butadiene-styrene, random or block copolymers, butadiene-acrylonitrile copolymers, polychloroprene, polyisobutylene and polyurethanes; tackifying resins such as rosin derivatives and polyterpenes; fillers such as clay and silica; pigments such as titanium dioxide, zinc oxide; antioxidants and curing agents and accelerators. Another class of common pressure sensitive adhesives consists of polyacrylates, acrylic copolymers, polyvinyl ethers, or blends thereof utilized either alone (self crosslinking) or in conjunction with crosslinking agents such as peroxides, isocyanates, etc.

In summary, the p.s. adhesives referred to herein are of the conventional types mentioned above and applied from 20 to 40% solutions in aliphatic or aromatic hydrocarbons as well as from aqueous dispersions or solutions in other organic solvents i.e., ketones, esters, etc. The applied coating weight may vary from 10 to 50 pounds per ream.

Any conventional ink can be used to apply printed matter to the release coat which adheres to a tape substrate. In a preferred embodiment of this invention, the ink is a type commonly called flexographic ink, a thermostable stable ink which is resistant to boiling water, intended to be printed by the process well-known as a flexographic process. Flexographic inks are particularly useful in printing on cellulosic substrates such as cellophane, paper, cotton cloth and the like and on certain types of plastic film including polyvinyl acetate, polyvinyl alcohol, polyesters and polyolefins and also on certain metal foils such as aluminum foil. An example of preferred ink is Inmont's Flexo-Clip and Sun Chemical's Flex-Vac. These two inks exhibit unusual anti-blocking properties in conjunction with the herein-described release coat system. These two inks obviate the necessity for the prior art print seal overcoat. Borden also has a flexographic ink suitable for the purpose described herein which is available under formula 734RL00967.

Solvent systems commonly employed in the manufacture of flexographic inks are the lower aliphatic alcohols including propanol, isopropanol, ethanol and butanol; the lower aliphatic esters, in particular, ethyl acetate and the lower aliphatic ketones, in particular methyl ethyl ketone. The amount and type of solvent are regulated so as to give the ink the desired drying speed and degree of penetration.

Binders for ink vehicles are commonly selected from rosin esters, synthetic film-forming polymers, polyamides, alkyd resins and proteins, including casein, gelatine and soy protein. The choice of binder depends upon the particular substrate used, each type of fibrous or film material having specific requirements for optimum adhesion, as is known to those trained in the art.

In addition to the above-mentioned chief components, flexographic inks customarily contain various amounts of modifying agents selected from waxes such as beeswax or paraffin wax; drying oils such as linseed oil, castor oil, turpentine oil, menhaden oil or the salts of linoleic acid, oleostearic acid and the like with amines such as triethanolamine or hydroxypropylamine; as well as small quantities of so-called drier like cobalt resinate, cobalt linoleate or an aluminum soap of linseed or tung oil.

The liquid flexographic inks which can be used for printing on the release coat described herein should contain from 0.5 to 25% of a coloring agent, from 15 to 40% of a resinous binder and from 15 to 85% of an organic solvent or a blend thereof. Furthermore, these inks may include from 0.01 to 20% of a transfer-proofing agent, based on the dry ink solids. The transfer-proofing agent can be selected from Werner-type complexes of aluminum, chromium and titanium with fatty acids containing from 12 to 24 carbon atoms and derivatives thereof.

The release coating composition will now be further described by the following examples which are set forth for the purpose of illustration only. The proportions are in parts by weight unless specifically stated to the contrary.

EXAMPLE 1

This example illustrates fresh and aged characteristics of the printable release coat described herein:

| Resin Components: | |
|---|---|
| Acryloid A-11 (modifying agent) | 40 |
| Versamid 950 (plasticizer) | 50 |
| Vc-171* (film former) | 10 |
| | 100 |
| Solvent Components: | |
| MEK | 225 |
| methyl cellusolve | 225 |
| isopropanol | 45 |
| toluene | 405 |
| | 900 |

Above 10% solution was applied with a number 16 Mayer Bar to a 2-mil Mylar film, air dried and oven heated for 3 minutes at 250°F. After cooling, three strips of a 1 inch standard cellophane pressure-sensitive tape were placed on the coated surface and pressed by rolling twice in both directions with a 4½ rubber roller. A similar procedure was utilized to apply three strips of the same cellophane pressure-sensitive tape to a plain 2-mil Mylar film. Both overtape sets were shelf and oven (120°F) aged for 12 days and the force required to separate the 1 inch cellophane tape strips from the Mylar backing (T-Peel Adhesion) was measured on an Instron machine. In addition, the rolling ball tack (RBT) was measured to check any detackification of pressure-sensitive adhesive.

The test data averaged from several readings are shown in Table I.

Table I

|  | Release-Coated Mylar | Plain Mylar |
|---|---|---|
| T-Peel Adhesion, oz/in |  |  |
| 12 day shelf | 22.0 | 51 |
| 12 day 120°F | 24.9 | 54 |
| Rolling Ball Tack, inches |  |  |
| 12 day shelf | 0.4 | 0.38 |
| 12 day 120°F | 0.5 | 0.38 |

Above data indicates good tack retention and release efficiency. T-Peel values of the coated Mylar are roughly one-half of readings for plain substrate.

EXAMPLE 2

This example illustrates ink receptivity or adhesion at the ink/release coat interface. Thus, a 2-mil thick 6 × 12 inches Mylar film was coated with the release coat formulation of Example 1 and a similar 6 × 12 inches Mylar substrate was coated with a prior art release agent. The prior art release agent was a 2% toluene solution of octadecyl polyvinyl carbamate which was applied with a number 4 Mayer Bar. These release agents and their preparation are fully described in U.S. Pat. No. 2,532,011. After air and oven drying at 3 minutes and 250°F, both Mylar sheets were overcoated with a flexographic ink having the composition shown below:

| nitrocellulose | 25.0 |
|---|---|
| fatty monosubstituted amide | 13.5 |
| carbon black | 1.5 |
| black oxide of iron | 5.0 |
| methyl silicone oil | 0.5 |
| magnesium naphthenate | 0.5 |
| ethanol | 20.0 |
| isopropanol | 10.0 |
| n-propanol | 7.0 |
| ethyl acetate | 15.0 |
| toluene | 2.0 |
|  | 100.0 |

Using a number 0 Mayer Bar to assess the bonding of above ink to the release coated surfaces, a 1 × 6 inches strip of pressure-sensitive cellophane tape was placed firmly on each of the ink coated Mylar sheets and one end of the tape subsequently pulled back first slowly and next rapidly at an angle less than 180°. Complete ink lifting and transfer to the pressure-sensitive adhesive tape was observed for the sample coated with the prior art release agent whereas the tape strip removed from the sample coated with the release formulation of Example 1 showed no ink traces. In addition, poor coverage and wetting was noticed when the above ink was applied to the Mylar sheet coated with the prior art release agent.

EXAMPLE 3

This example illustrates the release coating described herein and some of the more important properties thereof. Thus, the release coat of Example 1 was applied from a 10% solution with a number 9 Mayer Bar onto a clear acetate film backing of a commerical, reinforced strapping tape. The pressure-sensitive adhesive of this tape was formulated with the following ingredients:

|  | Parts by Weight |
|---|---|
| natural rubber (Mooney 55) | 100 |
| zinc oxide | 5 |
| polyterpene tackifying resin (mp. 115°F) | 90 |
| antioxidant (2,5-ditertiary amyl hydroquinone) | 2 |
| accelerators: |  |
| dipentamethylene thiurametetra-sulfide | 0.5 |
| zinc dimethyldithiocarbamate | 2 |

The above pressure-sensitive adhesive was applied at a coating weight of 50 lbs/ream from a 25% solution in toluene having an average viscosity of 20,000 cps. One-inch wide roll samples of the finished tape were tested for adhesion to steel, rolling ball tack and unwind force at various speeds after storage under the conditions described below. The obtained results are shown in the following table:

Table II

| Adhesion, oz/inch |  |  |
|---|---|---|
| 12 day shelf | 42 |  |
| 12 day 120°F | 46 |  |
| Rolling Back Tack, Inches |  |  |
| 12 days shelf | 0.5 |  |
| 12 days 120°F | 0.41 |  |
| Unwind Force oz/in | 12 Days, Shelf | 12 Days, 120°F |
| 1 ft/min. | 36.5 | 45 |
| 15 ft/min. | 49 | 55 |
| 60 ft/min. | 55.5 | 68 |
| 160 ft/min. | 55.5 | 64 |

To check the ink receptivity of this tape, the test described in Example 2 was modified in the sense that 1 inch wide strips were pressed firmly and close enough to each other on a 12 × 6 inch Mylar backing to form an almost continuous surface, with the pressure-sensitive adhesive being in contact with the Mylar backing. Subsequently, the ink of Example 2 was applied with a number 10 Mayer Bar to the release coating. After ink drying, the coated tape backings were overtaped with 1 inch wide strips of the roll prepared in this Example utilizing the standard 4½ lbs. rubber rolls with the pressure-sensitive adhesive being in contact with the release coating. These laminates were shelf and over aged for 12 days. After this period, the tape pairs were separated by pulling backwards one end of the upper overtaped strip first slowly and then rapidly at an angle little less than 180°. No ink transfer or adhesive pickoff was observed in spite of the very aggressive pressure-sensitive adhesive utilized for this tape. Aggressive pressure-sensitive adhesive generally is defined as one having an adhesive force of about 40 to 70 oz/inch.

EXAMPLE 4

This Example illustrates the improved antistatic properties of the new release coat described herein. Six 1 × 12 inches tape strips from a finished roll of Example 3 were taped as close as possible on a 6 × 12 inches glass plate so as to form a continuous surface without folds or entrapped air. Subsequently, the release coated surface obtained was vigorously rubbed with a woolen cloth for about 15 seconds and held for 5 seconds about ⅛ above a layer of cigarette ash. The cigarette ash was collected in a vial and sifted through a perforated plastic cup to form a uniform layer on the surface of a white paper sheet previously cut to match the size of the glass plate. To ensure a uniform ⅛ distance to the ash layer, the glass plate was placed parallel against the edges of two standard 12-inch rulers. Light ash pick up was observed. In contrast, when above procedure, adapted from U.S. Pat. No. 3,332,912, was repeated on a similar tape coated with a standard release agent described in Example 2, the ash pick-up was moderate to heavy.

EXAMPLE 5

This Example illustrates the versatility of the new release coat formulation. Thus, a release coat was made up by replacing in the release coat formulation of Example 1, 30 parts of Acryloid A-11 with the same amount of VMCH, a terpolymer comprising 86% vinyl chloride, 13% vinyl acetate and 1% maleic anhydride. A 10% solution of this release coat was applied with a number 16 Mayer Bar on the acetate backing of same commercial reinforced strapping tape described in Example 3. One-inch wide roll samples of the finished tape were tested for adhesion to steel, 90° tack, rolling ball tack, and unwind force at various speeds after storage under the conditions described below. The test data is summarized in the following table.

Table III

| Adhesion, oz/in | | |
|---|---|---|
| 12 days shelf | | 49 |
| 12 days 120°F | | 50 |
| 90° Tack, oz/in | | |
| 12 days shelf | | 28.5 |
| 12 days 120°F | | 24.0 |
| Rolling Ball Tack, Inches | | |
| 12 days shelf | | 0.85 |
| 12 days 120°F | | 0.85 |
| Unwind Force, oz/in. | 12 Days Shelf | 12 Days 120°F |
| 1 ft/min | 41 | 34.5 |
| 15 ft/min | 43.7 | 41 |
| 60 ft/min | 37 | 36.5 |
| 160 ft/min | 35.5 | 32 |

Another set of rolls was printed on a printing machine utilizing the black flexographic ink of Example 2. After shelf and oven (120°F) aging for 3, 6, 9 and 12 days, the ink definition was excellent and no ink transfer or adhesive pick-off was noticed at various unwind speeds. In contrast, a similar tape coated with the prior art release agent described in U.S. Pat. No. 3,475,196 and printed in identical conditions with the ink of Example 2, showed upon unwinding at low or high speeds, complete ink transfer to the adjacent pressure-sensitive adhesive.

A ternary release coating system has been described above. What is unique and original in the present disclosure is the discovery that each individual resin component, i.e., acrylic, vinyl, and polyamide resins, taken alone do not exhibit a desirable degree of release property toward an aggressive pressure sensitive adhesive. It is only because of an unusual synergism that my ternary system was found to form a hard anti-blocking surface upon solvent evaporation. In addition to its good release properties, same surface offers also the combined advantages of a sealant and multifunctional coating in regard to ink receptivity, intercoat adhesion, adhesion to substrate, clarity, and decorative durability.

What is claimed is:

1. A normally tacky pressure-sensitive adhesive tape comprising a backing, a normally tacky and pressure-sensitive adhesive coat on one side of said backing and a printable release coat on the opposite side of said backing, said release coat comprising, in parts by weight per 100 parts by weight of said release coat, 10 to 60 parts vinyl film former, 10 to 60 parts acrylic resin and 20 to 80 parts polyamide plasticizer resin, said vinyl film former is selected from polyvinyl chloride, polyvinyl acetate, vinyl butyral resins, copolymers of vinyl chloride and vinyl acetate, vinyl alcohol-acetate resins, copolymers of vinyl chloride and vinylidene chloride, copolymers of vinyl chloride and acrylonitrile and said vinyl film formers modified with butadiene elastomers; said acrylic resin is selected from polymers of $C_1$ to $C_6$ alkyl esters of methacrylic acid, copolymers of $C_1$ to $C_6$ alkyl methacrylates with less than 50% by weight of $C_1$ to $C_8$ alkyl acrylates, copolymers of $C_1$ to $C_6$ alkyl acrylates with styrene, and mixtures thereof; and said polyamide resin is selected from linear polyamide resins which are obtained by condensing polyfunctional amines with dimeric and trimeric fatty acids and such polyamide resins modified with waxes and plasticizers.

2. The tape of claim 1 wherein components of said release coat are soluble at room temperature in organic solvents and blends thereof.

3. The tape of claim 1 wherein said vinyl film former is a solution resin with average molecular weight of 10,000 to 100,000; said acrylic resin is a solution resin and contains lower alkyl groups and has average molecular weight in the range of 20,000 to 300,000; and said polyamide resin is a long chain linear polymer with average molecular weight in the range of 3,000 to 30,000 and a melting point in the range of 60° to 200°C.

4. The tape of claim 3 wherein average molecular weight of said vinyl film former is in the range of 20,000 to 60,000; that for acrylic resin is 60,000 to 150,000; and that for said polyamide resin is 6,000 to 9,000.

5. The tape of claim 1 wherein said vinyl film former is selected from copolymers of vinyl chloride, vinyl acetate and vinyl alcohol and of vinyl chloride and vinyl acetate containing 83% or more of vinyl chloride.

6. The tape of claim 4 wherein said vinyl film former is selected from vinyl chloride-vinyl acetate copolymers and such copolymers containing reactive carboxy or hydroxy groups introduced by copolymerization with a material selected from anhydrides and alcohols; said acrylic resin is selected from $C_1$ to $C_6$ alkyl methacrylate copolymers, copolymers of $C_1$ to $C_6$ alkyl methacrylates with less than 50% by weight of $C_1$ to $C_8$ alkyl acrylates, and mixtures thereof; and said polyamide resin being an amorphous resin with a softening point in the range of 40° to 150°C.

7. The tape of claim 6 wherein the amount of vinyl film former is 15 to 50 parts, that for acrylic resin is 15 to 50 parts and that for polyamide resin is 50 to 40 parts.

8. The tape of claim 6 wherein said backing is a plastic film cellulose derivative, components of said release coat being soluble at room temperature in a blend of organic solvents containing isopropanol wherein said blend has a solubility parameter in the range of 8 to 12.

9. The tape of claim 7 including printed matter on said release coat.

10. The tape of claim 9 wherein said printed matter is a thermostable, flexographic ink resistant to boiling water and said backing is a cellulose derivative.

11. The tape of claim 10 wherein said backing is cellulose acetate and said flexographic ink is characterized by a composition which includes nitrocellulose, fatty nonsubstituted amide, carbon black, black oxide of iron, methyl silicone oil, magnesium naphthenates and a solvent system containing isopropanol and ethyl acetate.

* * * * *

UNITED STATES PATENT OFFICE
CERTIFICATE OF CORRECTION

Patent No. 3,978,274　　　　　　　　Dated August 31, 1976

Inventor(s) Alfred Blum

It is certified that error appears in the above-identified patent and that said Letters Patent are hereby corrected as shown below:

Col. 1, line 43, change "of" (second occurrence) to --or--;

Col. 6, line 9, change "50-50" to --50-40--;

Col. 7, line 49, delete "stable";

Col. 8, after the Table in Example 1, insert --*Vc-171 is a vinyl chloride/vinyl acetate resin containing about 10 to 12% vinyl acetate produced by Borden Chemical having an average molecular weight of about 60,000 and a relative viscosity of 1.80 which viscosity is obtained by preparing a 1% solution thereof in cyclohexanone and measuring the value at 25°C.--;

Col. 8, line 60, after "4-1/2" insert --lb.--;

Col. 11, line 2, after "1/8" insert --inch--.

Signed and Sealed this

Twenty-third Day of November 1976

[SEAL]

Attest:

RUTH C. MASON　　　　　　　　C. MARSHALL DANN
Attesting Officer　　　　　　Commissioner of Patents and Trademarks